United States Patent
Blain et al.

[11] Patent Number: 5,983,802
[45] Date of Patent: *Nov. 16, 1999

[54] SEPARATION SYSTEM

[75] Inventors: Jim W. Blain, Scotts Valley; Robert Arthur Nelson, Santa Cruz, both of Calif.; Duane D. Grosskrueger, Highlands Ranch, Colo.; John J. Smith; Michael D. Krohn, both of Littleton, Colo.

[73] Assignee: Lockheed Martin Corporation, Bethesda, Md.

[ * ] Notice: This patent is subject to a terminal disclaimer.

[21] Appl. No.: 08/999,572

[22] Filed: Dec. 16, 1997

[51] Int. Cl.$^6$ .............................. F42B 15/10; C06C 5/00; B64D 1/04
[52] U.S. Cl. ...................... 102/378; 102/275.5; 89/1.14
[58] Field of Search ..................................... 102/378, 377, 102/374, 275.5, 275.9, 275.11, 275.12; 89/1.14, 1.57, 1.51, 1.811

[56] References Cited

U.S. PATENT DOCUMENTS

| | | | |
|---|---|---|---|
| 3,230,885 | 1/1966 | Weber et al. | 89/1.14 |
| 3,373,686 | 3/1968 | Blain et al. | 102/22 |
| 3,453,960 | 7/1969 | Qualls | 102/378 |
| 3,486,410 | 12/1969 | Drexelius et al. | 89/1 |
| 3,633,456 | 1/1972 | Carr et al. | 102/378 |
| 3,698,281 | 10/1972 | Brandt et al. | 89/1 B |
| 4,137,848 | 2/1979 | Cunha | 102/378 |
| 4,685,376 | 8/1987 | Noel et al. | 89/1.14 |
| 5,046,426 | 9/1991 | Julien et al. | 102/377 |
| 5,109,749 | 5/1992 | Olcer | 89/1.14 |
| 5,129,306 | 7/1992 | Fauvel | 89/1.14 |
| 5,331,894 | 7/1994 | Wassell et al. | 102/275.12 |
| 5,372,071 | 12/1994 | Richards et al. | 102/378 |
| 5,390,606 | 2/1995 | Harris | 102/378 |
| 5,392,684 | 2/1995 | Renfro et al. | 89/1.14 |
| 5,585,596 | 12/1996 | Richards et al. | 102/378 |

OTHER PUBLICATIONS

OEA Aerospace, Inc. "X–SMDC Expanding Tube Design Summary," pp. 1–26, Date Unknown.
The Ensign–Bickford company, "System Overview," 1997, pp. 2–10, 16 and 17 (1997).

*Primary Examiner*—Charles T. Jordan
*Assistant Examiner*—Theresa M. Wesson
*Attorney, Agent, or Firm*—Holme, Roberts & Owen LLP

[57] ABSTRACT

A separation system for separating a first section from a second section is disclosed. In one embodiment, the separation system includes first and second doublers for initially interconnecting the first and second sections, an expandable explosive system contained in a cavity defined by the first and second doublers and first and second sections, and a slide plane including first and second slide members, the first and second slide members slidably engagable with each other for at least initially guiding the first section away from and relative to the second section upon severance of the first and second doublers.

18 Claims, 12 Drawing Sheets

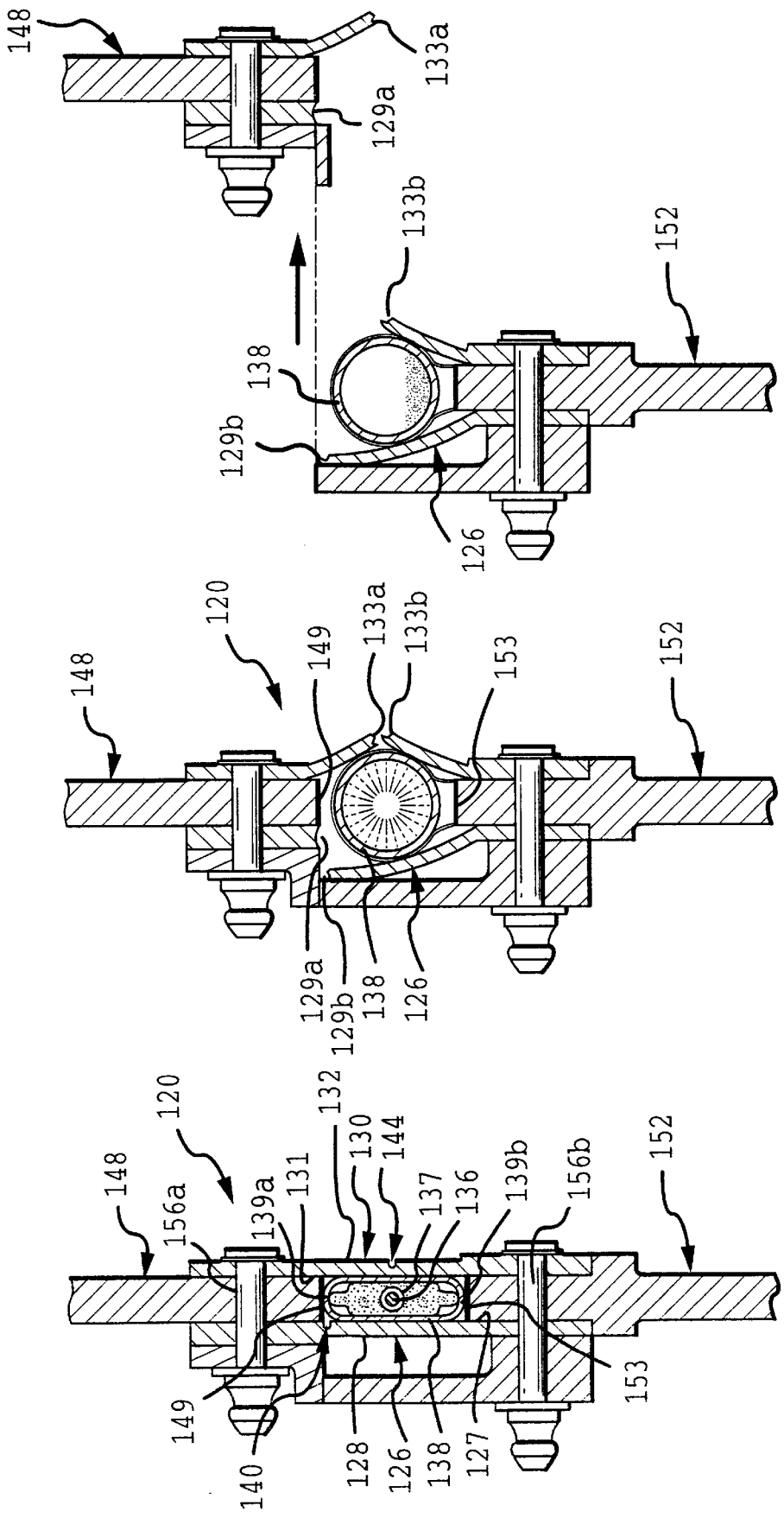

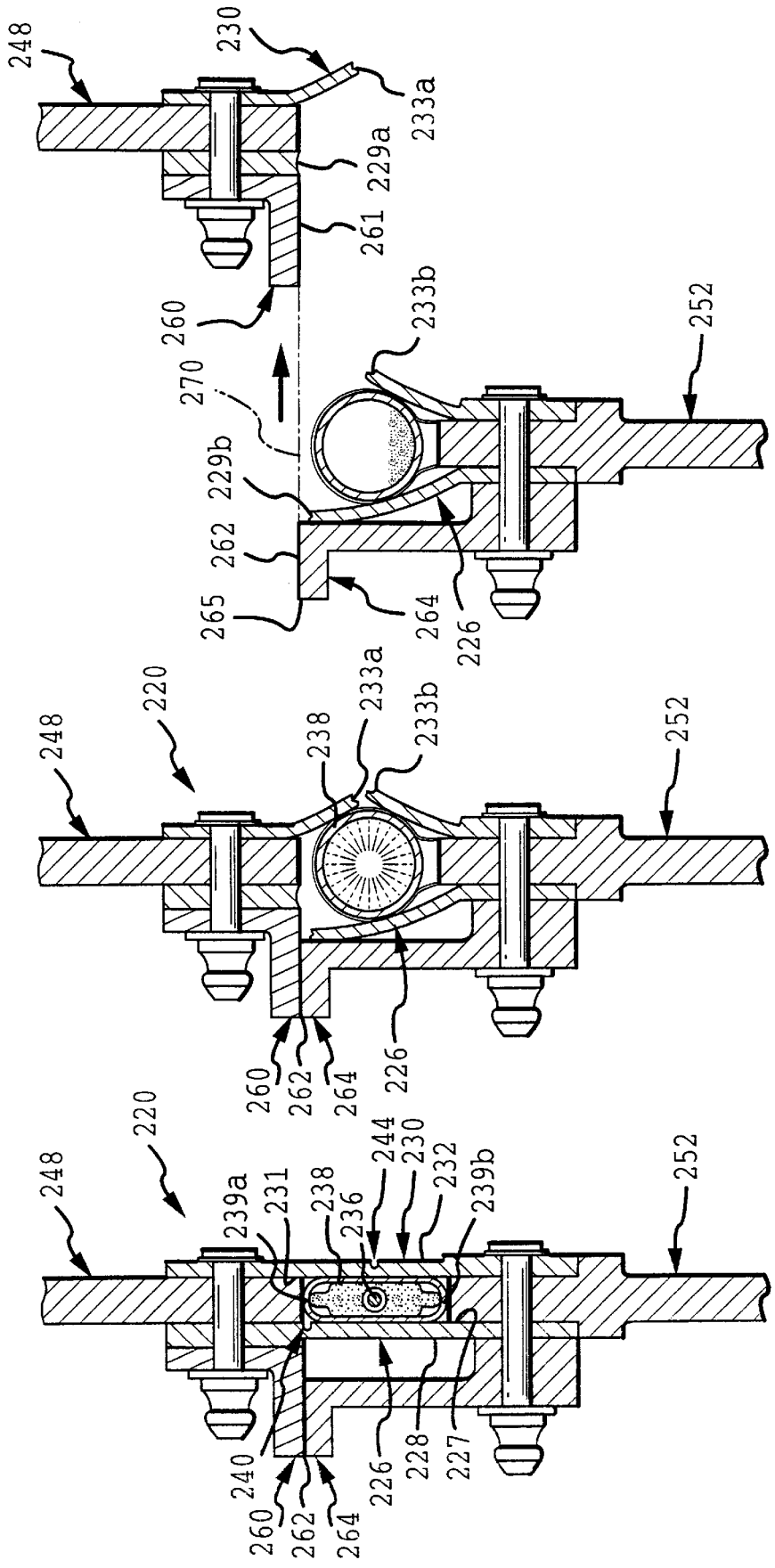

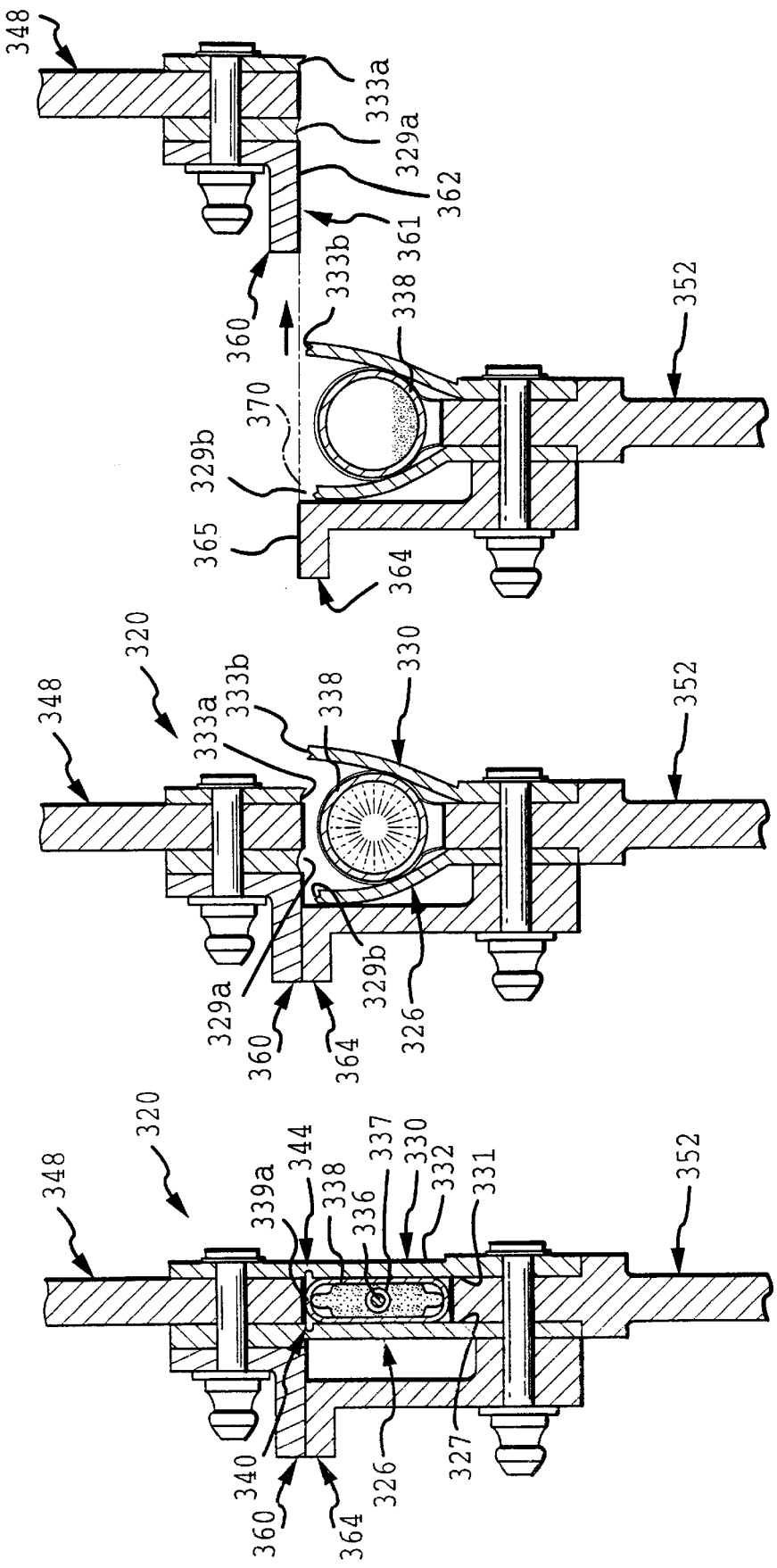

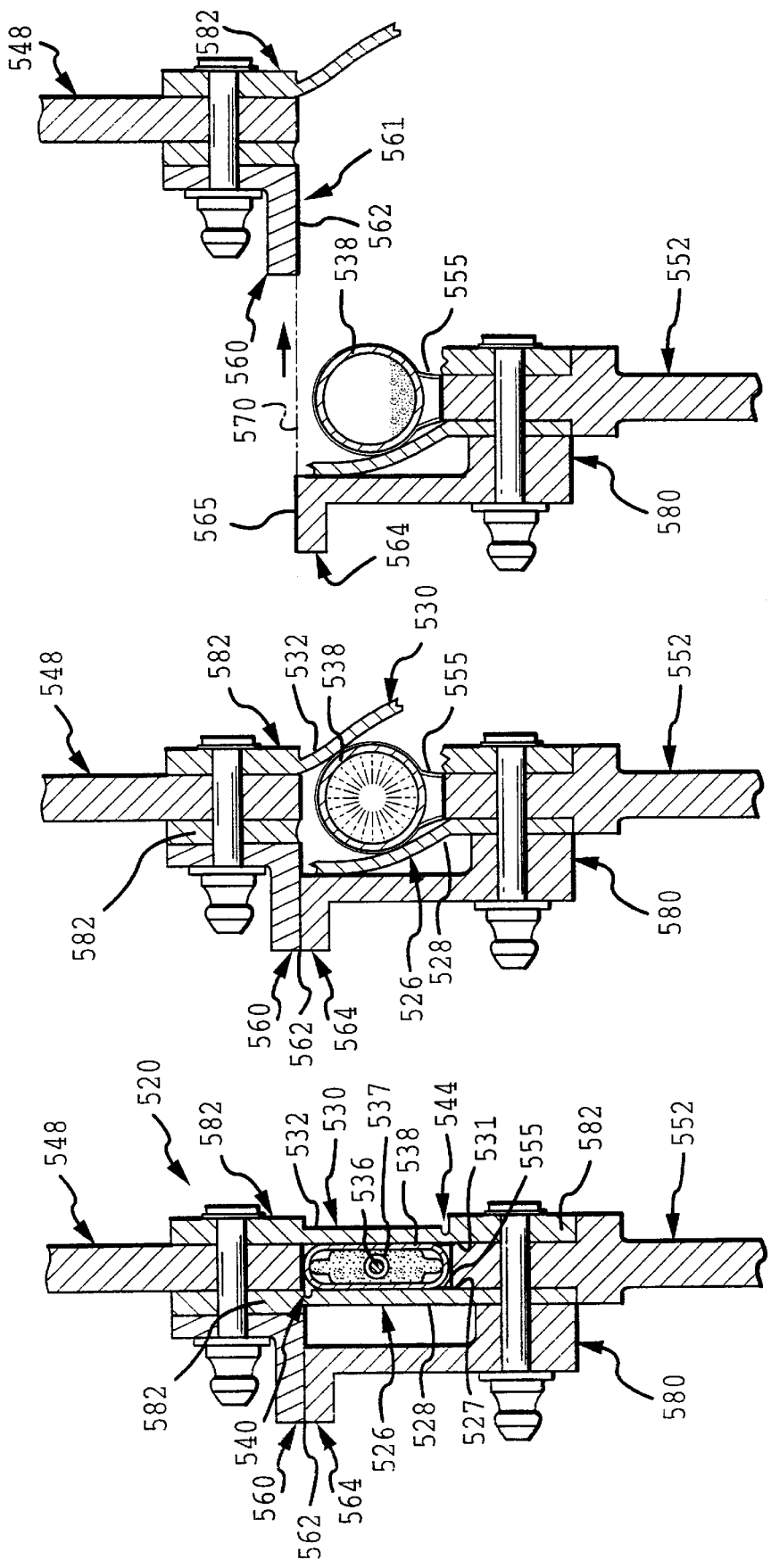

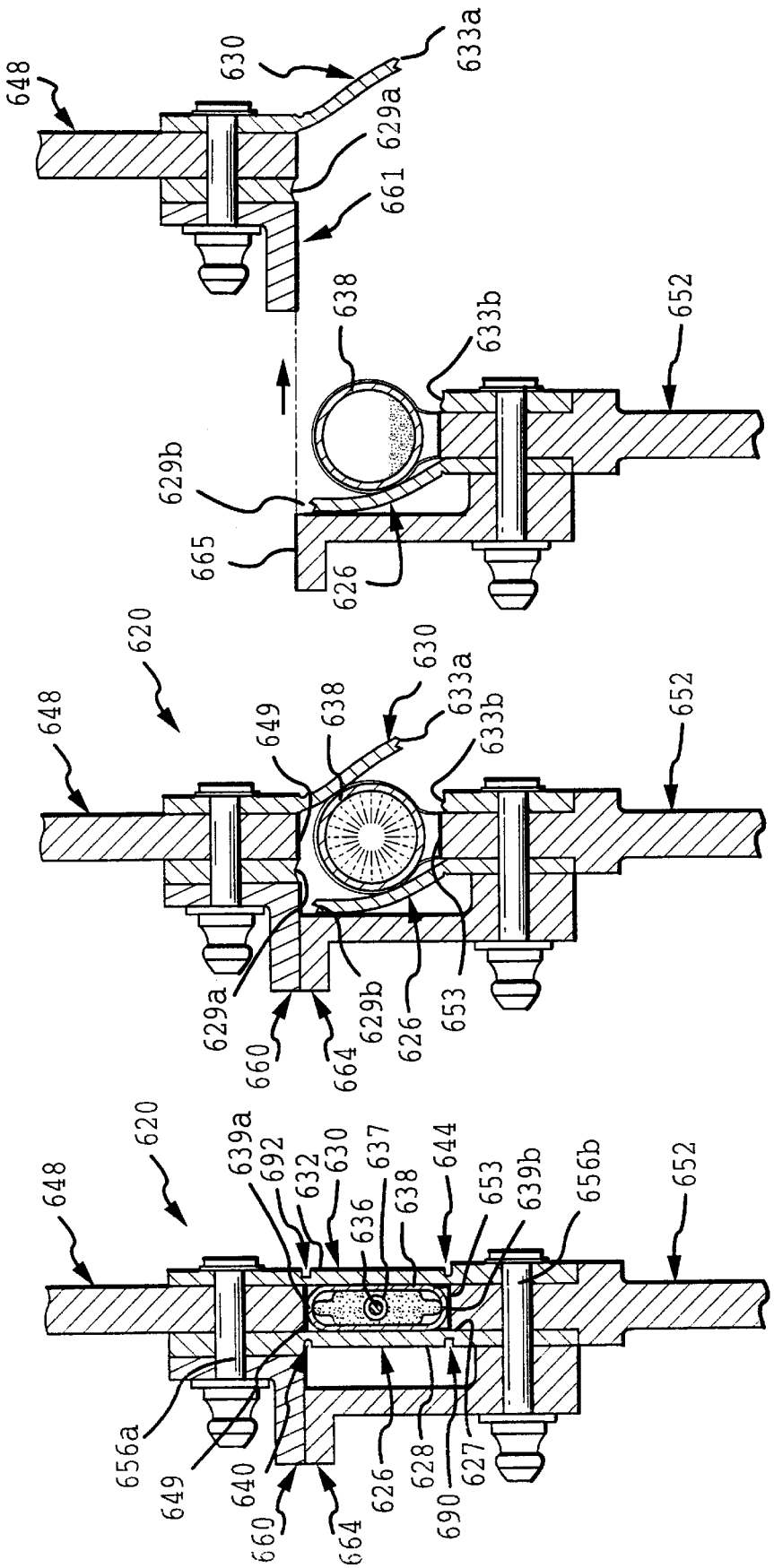

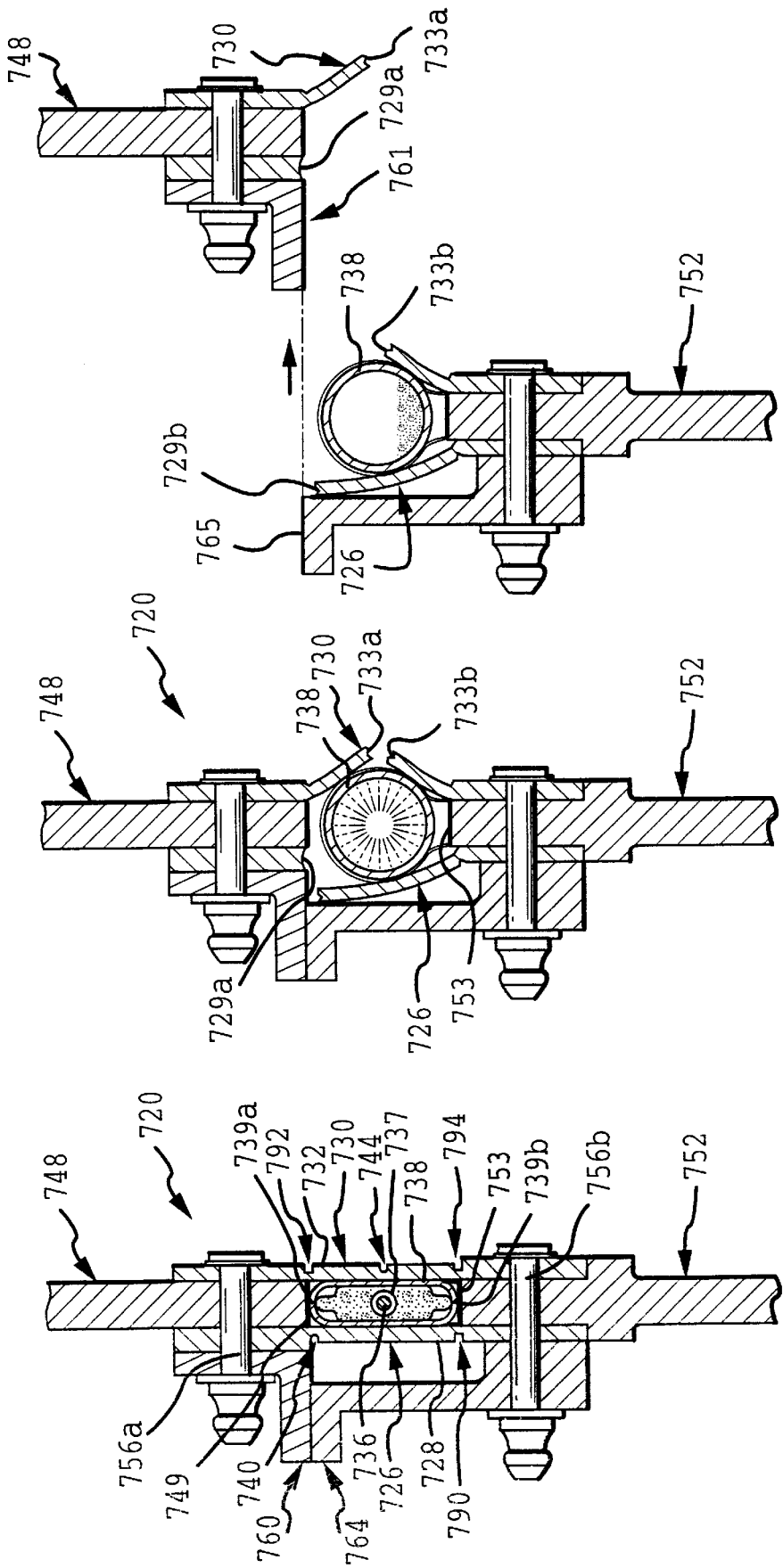

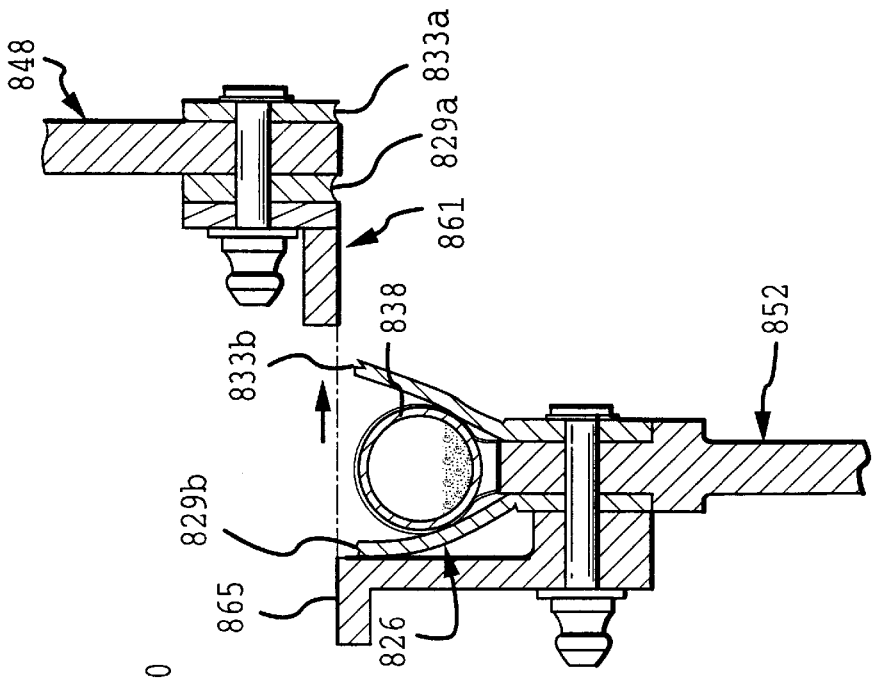
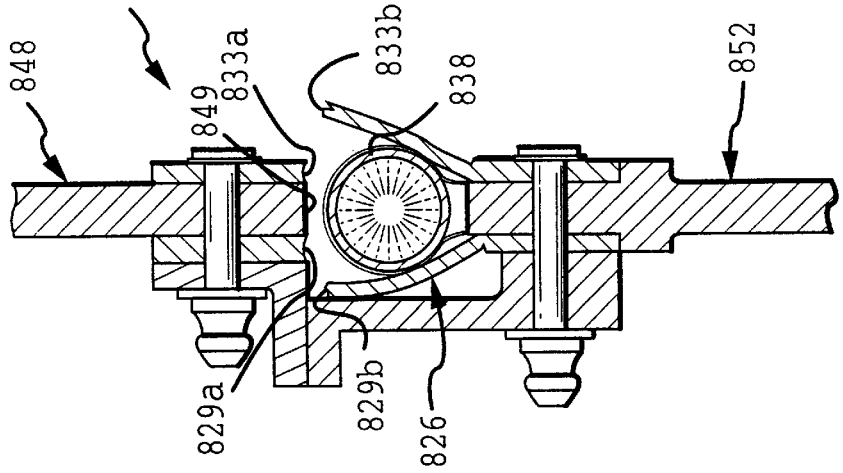
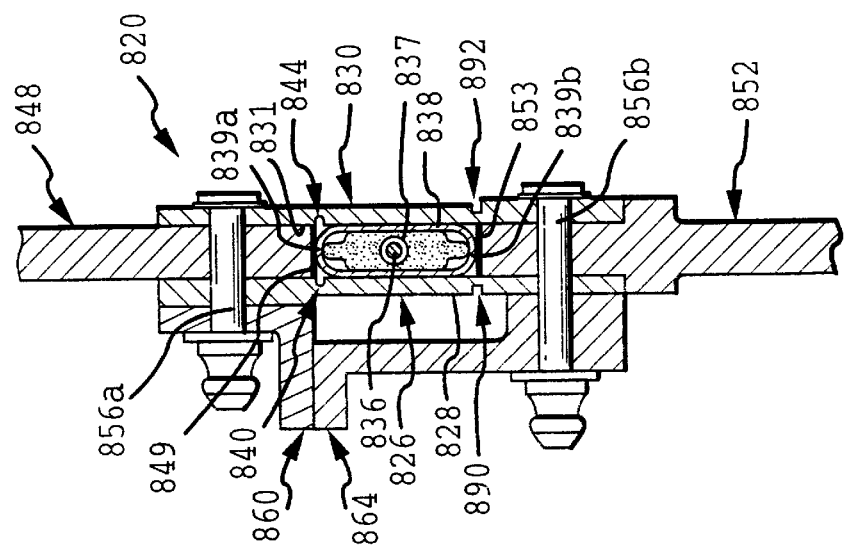
FIG. 10C
FIG. 10B
FIG. 10A

SEPARATION SYSTEM

GOVERNMENT RIGHTS

This invention was made with Government support under Contract No. F04701-95-C-0034 awarded by the U.S. Air Force to Lockheed Martin Corp. and the Government has certain rights in this invention.

FIELD OF THE INVENTION

The present invention generally relates to separation systems, and in particular, relates to a separation system for separating a first section from a second section.

BACKGROUND OF THE INVENTION

Various separation systems have been developed over the years in the launch vehicle industry to separate payload fairings from the launch vehicle, to thereby uncover any spacecraft contained therein for deployment. In this regard, both point separation devices and linear separation systems have been utilized over the years to separate payload fairings from the launch vehicle.

One major design consideration for not only launch vehicle separation system, but also for other separation systems is to provide a system which will not result in a collision of the separated structure with the remaining structure. For example, in the launch vehicle industry, it is important that separation system clear the payload fairing structures away from the launch vehicle to avoid any collision therebetween. However, designing such separation systems to avoid collisions have become increasingly difficult in instances where large, heavy structures are utilized.

SUMMARY OF THE INVENTION

Accordingly, it is an object of the present invention to provide a separation system.

It is another object of the present invention to provide a separation system which results in clean separation of one structure relative to another structure.

It is a further object of the present invention to provide a separation system which results in a substantially damage-free separation of a first structure relative to a second structure.

It is still another object of the present invention to provide a separation system which results in reduced separation shock.

It is yet another object of the present invention to provide a separation system which minimizes the opportunity for separation debris and contamination.

The present invention achieves one or more of these objectives by providing a separation system for separating a first structure from a second structure. Generally, the separation system includes at least a first structural member interconnecting the first and second sections, an explosive means, positionable against at least the first structural member, for breaking or severing at least the first structural member, and a slide plane means interconnected to at least the first structural member. Of importance, the slide plane means functions at least initially to guide one of the first and second sections away from and relative to the other of the first and second sections after at least the first structural member has been severed by firing of the explosive means. In this regard, the slide plane means inhibits undesireable contact during separation of the first section relative to the second section as the slide plane means guides one of the first and second sections away from the other of the first and second sections along a predetermined plane or path defined by the slide plane means.

In one embodiment, the slide plane means of the separation system of the present invention includes at least a first slide member interconnectable to one of the first and second sections. In this embodiment, for purposes of guiding the first section away from the second section such that severed portions of at least one of first and second structural members which initially interconnected the first and second sections do not adversely contact each other, the first slide member is orientable between about 1° and about 90° relative to at least one of the first and second structural members. In a preferred embodiment, the first slide member is orientable at about 90° relative to the first section to guide, at least initially, the first section orthogonally away from and relative to the second section. For example, in instances where a vehicle having a first section (e.g., payload fairing, payload, door, window, canopy, spacecraft, etc.) and a second section (e.g., core launch vehicle, land-based vehicle, air-based vehicle or sea-based vehicle) is moving in a first direction (e.g., along a longitudinal axis of the vehicle), separation in at least a second direction (e.g., at least laterally, relative to the longitudinal axis of the vehicle) of the first section relative to the second section may result by utilizing at least the first slide member of the separation system of the present invention, without substantially damaging the first or second sections. The present invention thus not only provides for separation of the first and second structures, but also reduces the application of undesireable forces from collisions by providing at least the first slide member, which at least initially guides the first section away from the second section along a path defined by the slide plane means.

In another embodiment, the slide plane means includes first and second opposing slide members or pads for guiding the first section away from the second section after severance of the first and second structural members by firing of the explosive means. In particular, the first and second pads are interconnectable to the first and second sections, respectively, and are capable of slidably engaging one another. In this regard, after firing of the explosive means to sever at least one of the first and second structural members, the first and second pads function to at least initially guide the first section away from the second section along at least a first separation plane defined by the first and second pads. For example, in instances where it is desirable to have the first section separate at least laterally relative to a longitudinally oriented second section, the first and second pads may be oriented between about 1° and about 90° relative to at least one of the first and second sections or relative to at least one of the first and second structural members. In one embodiment, the first and second pads are oriented about 90° relative to at least one of the first and second structural members to facilitate movement of the first section away from the second section, in a direction, at least initially, perpendicular to at least one of the first and second structural members (e.g., at least laterally). In instances where the first and second structures are included in a vehicle moving in the first direction, the slide plane means may be oriented at an angle of less than or equal to 90° (e.g., between about 10° and about 90°) relative to the first direction. In this regard, separation of the first structure away from the second structure at least in the second direction, along the slide plane means, may be enhanced due to the continuing movement of the vehicle having the second structure interconnected thereto in the first direction. To further enhance such guided separation, a low friction coating may be applied to at least one of the first and second pads.

In another aspect of the present invention, the separation system may further include first and second grooves or notches, positioned on the first and second displaced structural members, which facilitate fracture of the first and second structural members when the explosive means is fired, the first and second grooves defining first and second lines of fracture in the first and second structural members, respectively. In one embodiment, the first and second grooves are coplanar with each other and with the slide plane means. For example, the first and second grooves may be positionable on the first and second structural members, respectively, such that the first and second grooves are alignable with a first tangential plane defined by a first end portion of the explosive means in an unexploded state. Such positioning of the first and second grooves inhibits undesireable contact during separation as the first structure or section is free to move, at least initially, along a path defined by the slide plane means, whereby damaging contact between the severed ends of the first and second structural members can be avoided.

In another embodiment, for purposes of inhibiting damaging contact between severed portions of the first and second structural members after firing of the explosive means, the slide plane means is alignable or coplanar with one of the first and second grooves, which are offset from each other (e.g., not coplanar). In this embodiment, the first groove is displaced or staggered relative to the second groove along the first direction. In this embodiment, the first groove is positionable on one of first and second surfaces (e.g., explosive-facing and nonexplosive-facing sides) of the first structural member, on a first portion of the first structural member to define a line of fracture through the first structural member, and the second groove is positionable on one of the first and second surfaces (e.g., explosive-facing and nonexplosive-facing sides) of the second structural member, on a second portion of the second structural member to define a second line of fracture through the second structural member. The first portion of the first structural member is displaced along the first direction from the second portion of the first structural member. In this regard, a relatively damage-free separation at least in the second direction of the first structure relative to the second structure is thus facilitated as the first and second staggered grooves are positionable in the first and second portions of the first and second structural members, respectively. Alternatively, the slide plane means includes first and second opposing slide members or pads defining a slide plane substantially alignable with at least one of the first and second grooves. The first and second opposing slide members are interconnectable to first and second structures for slidably engaging each other to at least initially guide the first section away from the second section along the slide plane defined by the first and second slide members. Such slide plane means may be oriented to at least initially guide the first structure away from the second structure at least in the second direction, along one of the first and second lines of fracture defined by one of the first and second grooves aligned with the slide plane means.

For purposes of facilitating separation of and otherwise avoiding a substantial collision between the first and second structures, in one embodiment, the first notch on the first structural member is positionable along a first tangential plane defined by the explosive means in an unexploded state, and the second notch on the second structural member is positionable such that the second notch is aligned with at least a portion of the explosive means. In this regard, the second notch on the second structural member may be aligned with a center portion of the explosive core of the explosive means in an unexploded state, such that the second structural member will fracture or break as the explosive means expands to a circular configuration upon firing. In another embodiment, the staggered first and second notches on the first and second structural members, respectively, are both positionable along at least a first tangential plane defined by the explosive means in an unexploded state. In one embodiment, first and second tangential planes are defined by first and second end portions of the explosive means (e.g., end portions of an unfired explosive means), respectively. In this regard, the first and second offset break planes defined by the first and second displaced notches on the first and second structural members, respectively, may be substantially coincident with the first and second tangential planes defined by the explosive means in an unexploded state. In these embodiments, upon firing of the explosive means, the first and second structures are fracturable or severable at the weak points of the first and second structural members (i.e., at the first and second displaced or staggered notches). Due to the displaced or staggered positioning of the first and second notches, a relatively damage-free separation is facilitated upon such firing of the explosive means since adverse contact between the severed portions of the first and second structural members is minimized.

In another aspect of the present invention, in order to further enhance the opportunity for a relatively collision free separation between first and second structures, the first and second structural members of the separation system of the present invention may be configured or affected to bend about or hinge in a selected area. In this regard, bending of the first and second structural members upon firing or detonation of the explosive means may be controlled, to a certain degree, by providing bend augmentation means. In one embodiment, the bend augmentation means comprises a reinforced portion on at least one of the first and second structural members or doublers to facilitate bending of the first and second structural members about selected portions of thereof while facilitating the fracture of the first and second structural members. In another embodiment, the bend augmentation means comprises at least a first bend augmentation relief portion on at least one of the first and second structural members. Such a bend augmentation relief portion facilitates bending or hinging of at least one of the first and second structural members, about or in the relief portions, when the explosive means is fired, to thereby facilitate fracture of at least one of the first and second structural members at a portion thereof displaced from the bend augmentation relief portion. Such relief portions may be positioned in upper or lower portions of the structural members, on nonexplosive-facing surfaces of the structural members to further facilitate bending of the structural members upon firing of the explosive means.

BRIEF DESCRIPTION OF THE DRAWINGS

FIGS. 3A–3C illustrate cross-sectional progressive views of another embodiment of the separation system of the present invention;

FIGS. 4A–4D illustrate cross-sectional progressive views of still another embodiment of the separation system of the present invention;

FIGS. 5A–5C illustrate cross-sectional progressive views of still another embodiment of the separation system of the present invention;

FIGS. 7A–7C illustrate cross-sectional progressive views of another embodiment of the separation system of the present invention;

FIGS. 8A–8C illustrate cross-sectional progressive views of another embodiment of the separation system of the present invention;

FIGS. 9A–9C illustrate cross-sectional progressive views of another embodiment of the separation system of the present invention;

FIGS. 10A–10C illustrate cross-sectional progressive views of another embodiment of the separation system of the present invention.

DETAILED DESCRIPTION OF THE INVENTION

Figure 1:
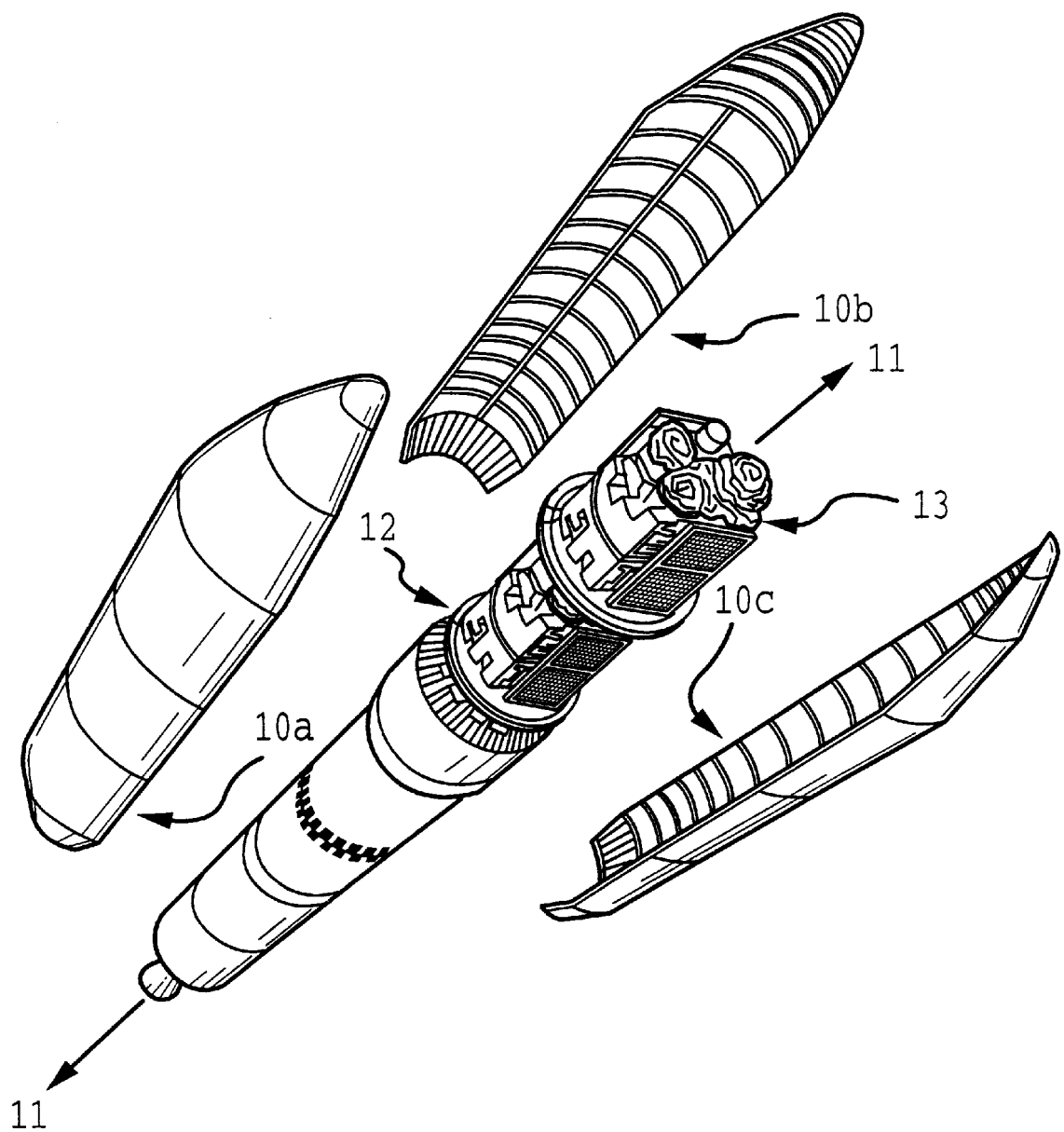
FIG. 1 illustrates a perspective view of lateral separation of tri-sector payload fairings from a launch vehicle utilizing the separation system of the present invention.

FIGS. 1–11 illustrate various features of the separation system of the present invention. Generally, the separation system of the present invention may be used to at least initially interconnect first and second structures or sections, and thereafter to separate the first structure from the second structure. Such separation allows other devices, such as conventional ordnance devices, thrusters, or spring-like devices, to be used to forcibly eject the first structure relative to the second structure. In this regard, the separation system of the present invention may be used in a variety of applications, including, but not limited to, at least lateral separation of tri-sector payload fairings 10a, 10b, 10c from the longitudinally extending core launch vehicle 12, the core launch vehicle traveling along its longitudinal axis 11, as illustrated in FIG. 1. Of course, the separation system of the present invention can also be used to at least laterally separate bi-sector payload fairings from a core launch vehicle (not shown). Further, while the embodiments of the separation system illustrated and described herein are primarily directed to at least laterally separating structures oriented at least longitudinally, the separation systems disclosed herein may be utilized for at least longitudinally separating structures which are at least laterally oriented.

Figure 2C:
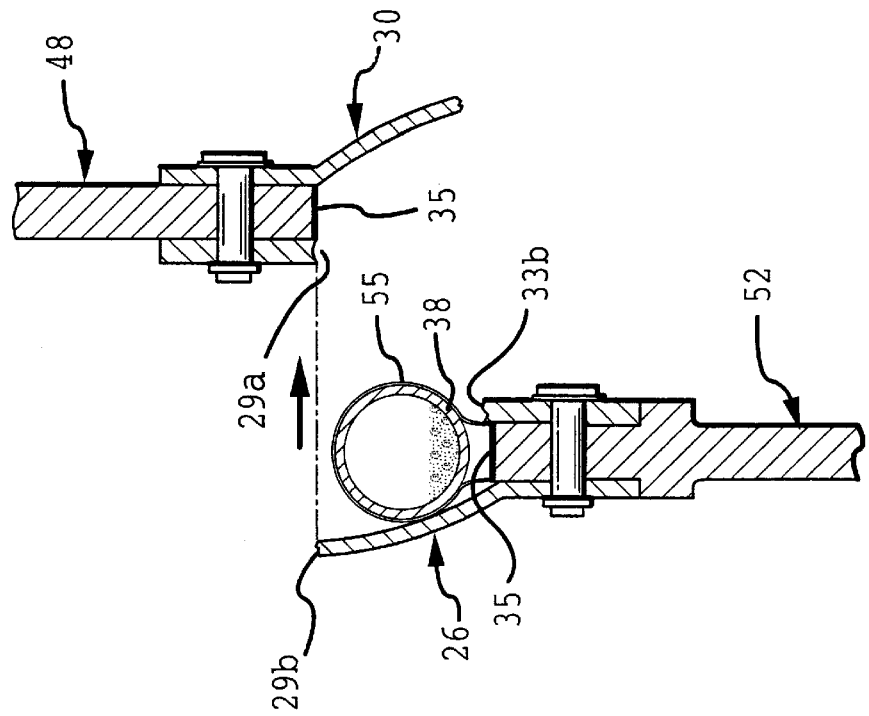
FIGS. 2A–2C illustrate cross-sectional progressive views of one embodiment of the separation system of the present invention.
Figure 2B:
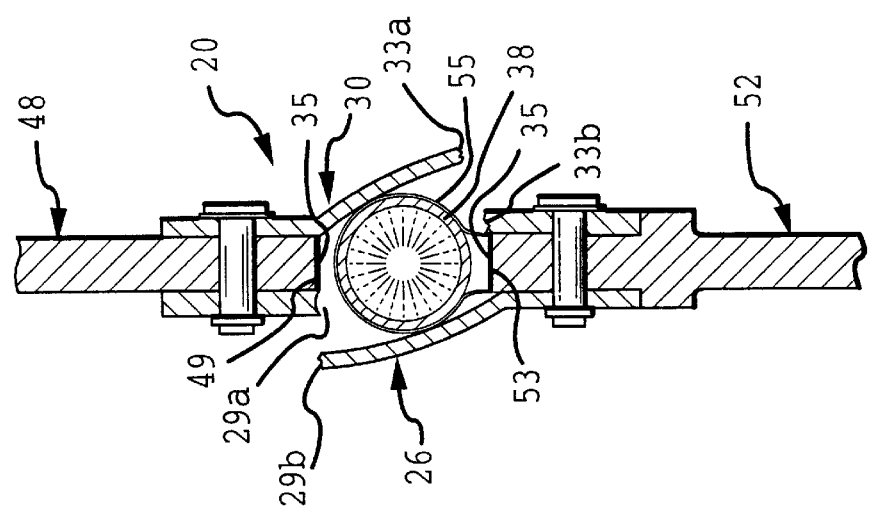
Figure 2A:
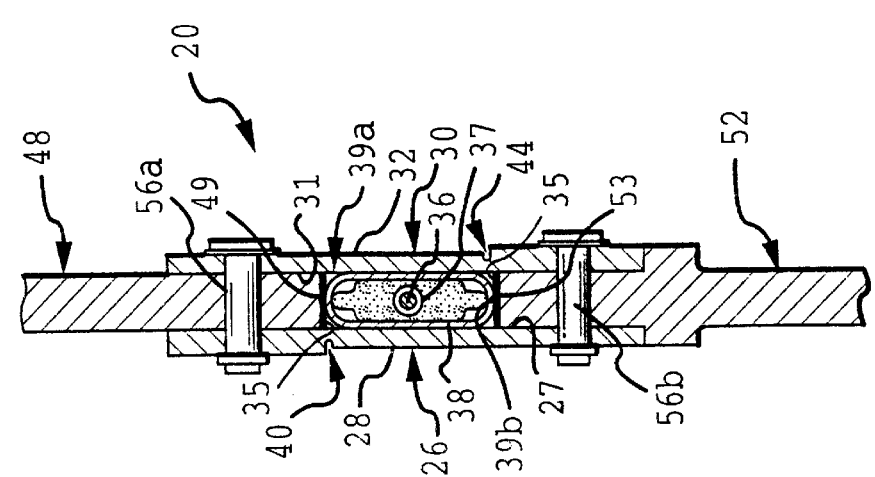

In one embodiment of the system of the present invention, illustrated in FIGS. 2A–2C, the separation system 20 includes first and second structural members or doublers 26, 30, an expanding tube explosive charge system having an explosive 36 contained between the first and second doublers 26, 30, and first and second grooves 40, 44 positioned on the first and second doublers 26, 30, respectively. The first and second doublers 26, 30 are interconnected to first and second sections or structures 48, 52, which may correspond to, for example, a payload fairing and the core of a launch vehicle, respectively. In this regard, the separation system 20 at feast initially interconnects the first and second sections 48, 52, and then functions to separate the first section 48 relative to the second section 52 by breaking or fracturing the first and second doublers 26, 30, as will be described in more detail hereinbelow.

In particular, and referring to FIG. 2A, first and second sections 48, 52 to be separated are at least initially interconnected to each other by the separation system 20 of the present invention. In this regard, first and second doublers 26, 30 of the present invention extend between and are interconnected to the first and second sections 48, 52 to be separated. Such interconnection may be accomplished via mechanical fasteners, such as bolts 56a, 56b, which extend through bores in the first and second doublers 26, 30 and through bores in the first and second sections 48, 52 respectively. End portions 49, 53 of the first and second sections 48, 52 and inner walls 27, 31, of the first and second doublers 26, 30 define a cavity or space therebetween for containing an explosive charge 36. Such explosive 36 (e.g., single or dual cord) may be contained within an elastomer 37, both of which are contained in an expandable metal tube 38. The expandable tube 38, which is interconnected to the second section 52 via a restraining strap 55 provides a contamination free separation of the first section 48 relative to the second section 52 when the explosive 36 is fired or detonated by containing the products of such detonation. In this regard, detonation of the explosive 36 results in inflation and expansion of the tube 38 to a generally circular configuration. Such expansion of the tube 38 breaks or fractures the first and second doubles 26, 30 which are in shear and/or tension at the first and second grooves or notches 40, 44, as will be explained in more detail hereinbelow. For purposes of absorbing shock forces generated by detonation of the explosive 36, a shock absorbing tape 35 fabricated, for example, from silicon rubber, may be interposed between the end portions 39a, 39b of the tube 38 and the end portions 49, 53 of the first and second sections 48, 52.

In one embodiment, illustrated in FIG. 2A, for purposes of facilitating at least lateral separation of the first longitudinally extending section 48 relative to the second longitudinally extending section 52, first and second grooves 40, 44 are positioned on outer walls 28, 32 of the first and second doublers 26, 30, respectively. The first and second grooves 40, 44 provide weak points in the first and second doublers 26, 30, to thereby define break or fracture planes along which the first and second doublers 40, 44 will fracture upon detonation of the explosive 36. In this embodiment, illustrated in FIG. 2A, the first groove 40 on the first doubler 26 is staggered relative to the second groove 44 on the second doubler 30. In this regard, the first and second grooves 40, 44 are not coplanar with each other (e.g., offset). Rather, in this embodiment, the first and second grooves or notches 40, 44 are positioned on the first and second doublers 26, 30 respectively, along tangential planes defined by end portions 39a, 39b of the unexpanded tube 38 containing the explosive 36. Specifically, the first groove 40 on the first doubler 26 is aligned with the tangential plane defined by a first end portion 39a of the unexpanded tube 38 while the second groove 44 is aligned with a second end portion 39b of the tube 38. Such positioning of the first and second grooves 40, 44 facilitates a relatively damage-free separation of the first section 48 relative to the second section 52, since expansion of the tube 38 at detonation of the explosive 36 causes the first and second doublers 26, 30 to break and bend away from the tube 38 in such a way so as to permit the first section 48 to at least laterally move over the top of the expanded tube 38 and the severed portions 29a, 33a of the first and second doublers 26, 30, as illustrated in FIGS. 2B–2C.

FIG. 2B shows the separation system 20 of FIG. 2A after the explosive 36 has been detonated. Firing of the explosive 36 causes the tube 38 to expand to a substantially circular cross-section as a result of expanding gaseous detonation products. Such expansion of the tube 38 deforms portions of the first and second doublers 26, 40, as illustrated in FIG. 2B, and fractures or ruptures the weakened sections of the first and second doublers 26, 30 at the first and second grooves 40, 44. Since the elastomer 37 absorbs much of the shock from the explosive 36, the principle force causing expansion of the tube 38 is the high pressure forces generated within the tube 38 by the gaseous products of the explosion. Detonation or firing of the explosive 36 may be accomplished electrically via control circuitry (not shown).

As illustrated in FIG. 2B, the first and second sections 48, 52 are separable after firing of the explosive 36. In this regard, the first section 48 is movable relative to the second section 52. In one embodiment, where at least lateral separation relative to longitudinally extending doublers 26, 30 is desired, the separation system 20 of a present invention is particularly useful in avoiding undesireable contact between the first and second sections 48, 52 and/or adverse contact between the sections 48, 52 and the expanded tube 38, especially in instances where at least lateral separation of the first section 48 relative to a longitudinally moving second section 52 is desired. In this regard, the selected positions of first and second grooves 40, 44 on the first and second doublers 26, 30, respectively, facilitate such separation as the resulting fractured end portions of 29a, 29b, 33a, 33b of the first and second doublers 26, 30, respectively, are not likely to adversely collide with each other or with the expanded metal tube 38, which remains interconnected to the second section 52 after detonation of the explosive 36 via the restraining strap 55. In this regard, the first section 48 is free to at least laterally separate from and relative to the second section 52, as illustrated in FIG. 2C. Such lateral separation may be accomplished by an ejection means (not shown), which functions to push or force the first section 48 laterally away from and relative to the second section 52.

In another embodiment, illustrated in FIGS. 3A–3C, for purposes of maximizing the fracturing forces generated by detonation of the explosive 136 and expansion of the tube 138 while facilitating a relatively collision-free separation of the first and second structural members or doublers 126, 130, the first and second grooves 140, 144 are staggered (nonplanar) relative to each other and are further positionable on the explosive-facing and nonexplosive-facing sides 127, 132 of the first and second structural members 126, 130, respectively. In this embodiment, the second groove 144 is positionable proximate a center portion of the expandable tube 138 and/or the explosive 136, as opposed to along a tangential plane defined by an end portion of the explosive means. In this regard, the second structural member 130 will fracture substantially in tension due to bending when the tube 138 expands upon firing of the explosive 136 to a circular cross-section, as illustrated in FIG. 3B. In addition, in order to enhance the likelihood for a collision-free separation of the first section 148 relative to the second section 152, the first groove 140 is positionable on the first structural member 126 along a tangential plane defined by an end portion 139a of the expandable tube 138 containing the explosive 136 (in an unexploded state). Such positioning of the staggered grooves 140, 144 also enhances the fracturability of the first and second structural members 126, 130 and reduces shock since less force is required to break the doublers 126, 130. In particular, locating the second groove 144 on the nonexplosive-facing side 132 of the second structural member 130 proximate a center portion of the explosive system shifts the stress concentration to the area of tension load due to bending to facilitate fracturing of the second structural member 130. In this regard, the second doubler 130 will break or fracture in tension upon firing of the explosive 136 and the resulting expansion of the tube 138. Furthermore, locating the first groove 140 along a tangential plane defined by the unexpanded tube 138 provides for the fracture of the first doubler 126 along a break plane above the expanded tube 138 (e.g., after firing of explosive 136), which facilitates a relatively damage-free separation of the first and second sections 148, 152. Once the doublers 126, 130 are fractured and deformed, the first section 148 is substantially free to separate relative to the second section 152, as illustrated in FIGS. 3B–3C. As such, this staggered arrangement of the grooves 140, 144 reduces the likelihood of application of undesireable forces between the severed sections 129a, 129b, and 133a, 133b of the first and second structural members 126, 130 with each other and/or with the expanded tube 138.

In yet another embodiment of the present invention, illustrated in FIGS. 4A–4C, the separation system 220 of the present invention includes first and second structural members or doublers 226, 230 interconnecting first and second sections 248, 252 to be separated, first and second grooves 240, 244 positioned on explosive-facing and nonexplosive-facing surfaces 227, 232 of the first and second doublers 226, 230, respectively, a single explosive charge 236 contained within an expandable tube 238 which is positioned between the first and second doublers 226, 230 and between the first and second sections to be separated 248, 252, and a slide plane means defined by first and second slide members 260, 264 interconnectable to the first and second sections 248, 252 for facilitating a relatively collision-free separation of the first section 248 relative to the second section 252. More specifically, for purposes of breaking the first and second doublers 226, 230 along break planes to permit a relatively collision-free lateral separation of the first section 248 relative to the second section 252, the first and second grooves 240, 244 are positioned on the inner and outer walls 227, 232 of the first and second doublers 226, 230, respectively. Positioning of the first and second grooves 240, 244 on the explosive-facing and nonexplosive-facing walls 227, 232 of the first and second doublers 226, 230, respectively, results in areas of tension load due to bending, which facilitates fracturing of the doublers 226, 230. Further, the first and second grooves 240, 244 are staggered. In this regard, the first notch or groove 240 is positioned in substantial alignment with a tangential plane defined by end portion 239a of the expandable tube 238 enclosing the unexploded charge 136. The second notch or groove 244 is positioned proximate a central portion of the expandable tube 238, in a center portion of the doubler 230, such that the second doubler 230 will break in a central section of the second doubler 230, when the tube 238 expands to a circular configuration upon firing of the explosive 236. Such positioning of the first and second grooves 240, 244 results in severance or fracture of the first and second doublers 226, 230. In this regard, the first and second grooves 240, 244 are displaced or staggered relative to one another to facilitate fracture or severance of the first and second doublers 226, 230 at the first and second grooves 240, 244, as the first and second grooves 240, 244 define weakened areas of the first and second doublers 226, 230, respectively. As such, firing or detonation of the explosive charge 236 causes the tube 238 to expand to bend and break the first and second doublers 226, 230, such that the first section 248 is movable laterally over the tube 238, which is restrained in a conventional manner to the second section 252, as illustrated in FIG. 4B. Severance or fracture of the first and second doublers 226, 230 at the first and second grooves 240, 244 allows a substantially collision-free separation of the first section 248 relative to the second section 252 as the fractured ends 229a, 229b of the first doubler 226 and the fractured portions 233a, 233b of the second doubler 230 can clear each other.

Figure 4D:
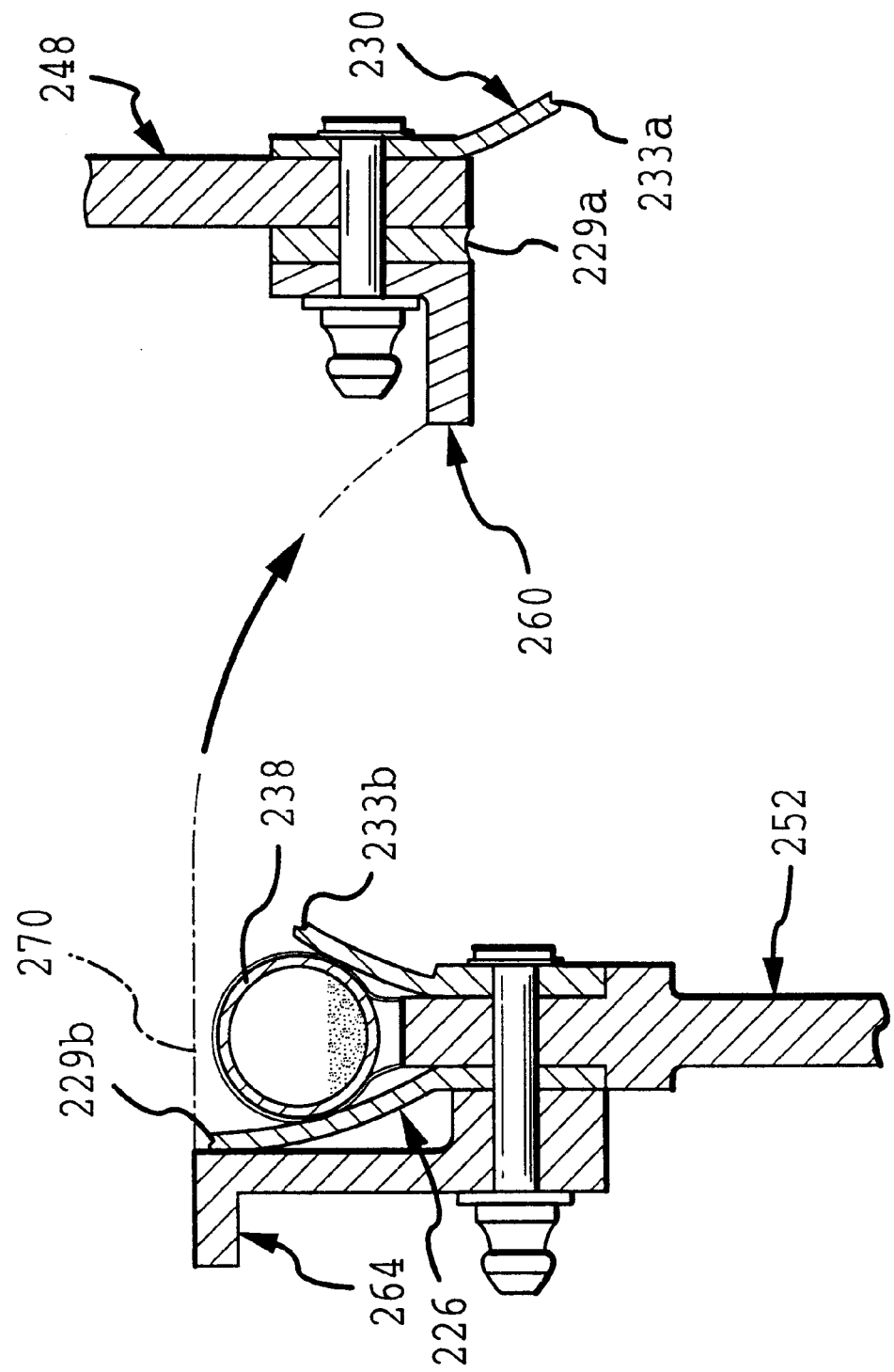

Referring to FIGS. 4A–4C, a relatively damage-free lateral separation of the first section 248 relative to the second section 252 is further facilitated by the slidable engagement of the first slide member 260 relative to the second slide member 264, the first and second slide members 260, 264 being interconnected to the first and second sections 248, 252 to be separated and defining a slide plane 270 along which, at least initially, the first section 248 may move relative to the second section 252. In particular, after the first and second doublers 226, 230 are severed by detonation of the explosive 236, the first section 248 may be moved (e.g., ejected) relative to the second section 252. For purposes of facilitating at least, for example, lateral separation of the first section 248 relative to the second section 252, the first and second slide members 260, 264 and specifically, the surfaces 261, 265 of the first and second slide members 260, 264, are oriented at least laterally (e.g., 90°) relative to the longitudinally extending first and second doublers 226, 230. As such, these first and second slide members 260, 264 facilitate a substantially damage-free separation by at least initially inhibiting downward longitudinal movement of the first section 248 relative to the second section 252, at least until the first section 248 has cleared the second section 252, as illustrated in FIGS. 4B–4C. In this regard, the first and second slide members 260, 264 at least initially inhibit undesireable contact of the first section 248 with the exploded metal tube 238 and the second section 252, as illustrated in FIG. 4C. Once at least laterally cleared from the second section 252, the first section is free to move longitudinally downwardly relative to the longitudinally extending and moving second section 252, as illustrated in FIG. 4D.

In particular, the first and second surfaces 261, 265 of the first and second slide members 260, 264, respectively, are load bearing surfaces which are slidably engagable with each other, at least initially, to enable the first section 248 to laterally slide relative to and away from the second section 252. In this embodiment, illustrated in FIGS. 4A–4C, the first and second slide members 260, 264 are oriented substantially perpendicular to the longitudinally extending first and second doublers 226, 230 and relative to the first and second sections 248, 252 to be separated relative to each other. Further, for purposes of enhancing a relatively damage-free lateral separation of the first section 248 relative to the second section 252, the slide plane 270 defined by the first and second slide members 260, 264 is substantially aligned or coplanar with the first groove 240 on the first doubler 226, which defines a break plane for the first doubler 226. Such alignment of the slide plane 270 with the first groove 240 enhances separation and ejection of the first section 248 relative to the second section 252 by substantially inhibiting undesireable contact between the severed portions 229a, 229b of the first doubler 226. In an alternative embodiment (not shown), the slide plane may be defined by first and second slide members on the opposite (e.g., outboard) side of the first and second doublers and may be aligned with the second groove 244.

In this regard, collision-free lateral separation and ejection of the first section 248 relative to the second section 252 is possible, even in instances where the second section 252 continues to move in a direction parallel to a longitudinal axis of the second section 252, since the separation system 220 facilitates separation and ejection of the first section 248 in a direction at least orthogonal to the direction of movement of the second section 252. As such, the separation system 220 of the present invention is especially useful for laterally separating a first section 248 relative to a second section 252, even in instances where the second section 252 (e.g., core launch vehicle) is moving in a direction parallel to a longitudinal axis of the second section 252 to thus facilitate a collision-free separation of first section 248 relative to the second section 252.

For purposes of facilitating proper lateral ejection, at least one of the load bearing surfaces 261, 265 of the slide members 260, 264, respectively, can be coated with a low friction material. In this embodiment, illustrated in FIG. 4A–4C, the surface 265 of the first slide member 264 includes a lubricant or low friction coating 262, such as a dry film, molybdenum disulfide lubricant. Further, orientation and length of the first and second slide members 260, 264, may be varied, depending upon, for example, the orientation of the first and second doublers 226, 230 relative to the desired direction of separation (e.g., orthogonally) of the first section 248 from the second section 252, and the predicted or intended break planes of the doublers 226, 230. For example, the slide plane 270 may be substantially coplanar with at least one of the fracture or break planes in the first and second doublers 226, 230, to guide the first section 248 away from the second section 252, which thereby inhibits undesireable contact between the separated structures, as illustrated in FIG. 4B–4C. More specifically, the slide plane 270 defined by the first and second slide plane members 260, 264 may be positioned in substantial alignment with at least one of the break planes of the first and second doublers 226, 230 to at least initially inhibit downward longitudinal movement of the first section 248 relative to the second section 252 and specifically, to inhibit damaging contact between severed end portions 229a, 229b, 233a, 233b with each other and with the expanded tube 238. In this regard, the positioning of the staggered grooves 240, 244 and the slide plane means function to inhibit adverse contact between the severed portions of the first and second doublers 226, 230 with each other and with the expanded tube 238.

As illustrated in the above-described embodiments of the separation system, the first and second grooves on the first and second structural members or doublers may be staggered relative to each other to avoid undesireable contact between the separated portions. In addition, such separation systems may further include a slide plane means to further inhibit adverse contact between the separated sections. In another embodiment, a separation system which achieves a substantially damage-free separation while utilizing coplanar grooves on the first and second structural members is disclosed. In this embodiment, illustrated in FIGS. 5A–5C, the separation system includes a slide plane means which is coplanar with first and second opposing grooves on the first and second doublers, respectively. In view of such, the slide members which define the slide plane can be positioned and sized to at least initially inhibit collisions upon severance of the first and second doublers. Referring to FIGS. 5A–5C, in this embodiment of separation system, the system 320 includes first and second doublers 326, 330 for interconnecting, at least initially, first and second sections 348, 352 to be separated, an explosive charge 336 contained therebetween, coplanar first and second grooves 340, 344 positioned on the first and second doublers 326, 330 and first and second slide members 360, 364, which are aligned with the coplanar first and second grooves 340, 344 on first and second doublers 326, 330. The first and second grooves 340, 344 are positioned proximate a tangential plane defined by a first end portion 339a of the expandable tube 338 in an unexploded state. Further, for purposes of facilitating fracture of the first and second doublers 326, 330, the first and second grooves 340, 344 are positionable on explosive facing surfaces 327, 331 of the first and second doublers 326, 330. In order to achieve, for example, at least lateral separation of the first section 348 relative to the second section 352 while avoiding adverse contact between the severed portions 329a, 333a of the first and second doublers 326, 330 with the expanded tube 338 and/or with the severed end portion 333b of the second doubler 330, the first and second slide members 360, 364 can be positioned in substantial alignment with the first and second grooves 340, 344. In this regard, upon separation, the first section 348 is movable relative to the second section 353 along the slide plane 370 defined by the first and second slide members 360, 364, which substantially coincides with the line of fracture through the first and second doublers 326, 330. As such, the slide plane members 360, 364 function to at least initially inhibit downward movement of the first section 348 relative to the second section 352 to avoid damaging contact between the severed end portions 329a, 329b, 333a, 333b with each other and with the expanded tube 338. Further, the first and second slide members 360, 364 can be sized (e.g., in length) to be slidably engagable with one another to at least initially inhibit downward movement of the first section 348 relative to the second section 352, at least until an ejection system (not shown) operates to forcibly eject the separated first section 348 away from the second section 352.

Figure 6:
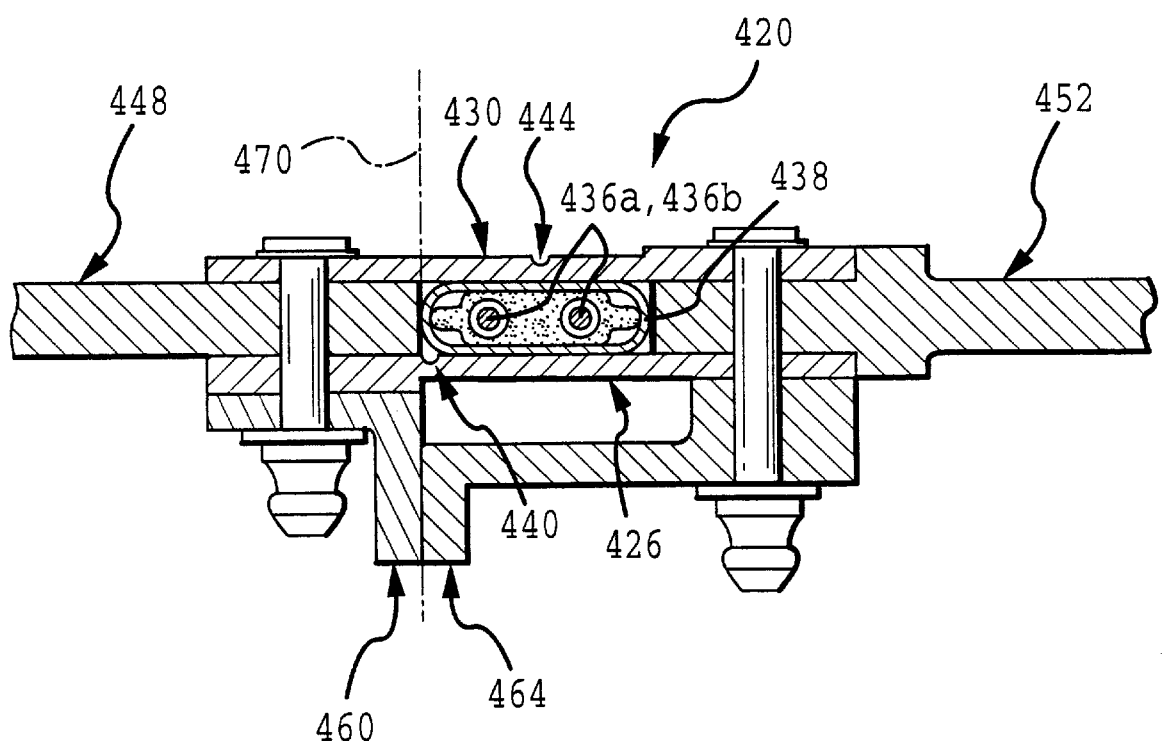
FIG. 6 illustrates a cross-sectional view of another embodiment of the separation system of the present invention for use, for example, in at least longitudinally separating a first section relative to a second section, which can be moving and/or oriented laterally.

FIG. 6 illustrates another embodiment and application of the separation system of the present invention. In this embodiment, the separation system 420 is used to at least longitudinally separate a first section (e.g., door) 448 from a second section (e.g., at least laterally moving vehicle) 452. Alternatively, the separation system may be used to separate the payload 13 illustrated in FIG. 1 from the longitudinally extending and moving core launch vehicle 12. Referring to FIG. 6, the separation system 420 includes first and second doublers 426, 430 for at least initially interconnecting the first and second sections 448, 452, a dual cord explosive system having two explosive charges 436a, 436b enclosed in an inflatable tube 438 for severing or breaking the first and second doublers 426, 430 upon detonation, and staggered, non-coplanar first and second grooves 440, 444 positioned on the first and second doublers 426, 430. As noted hereinabove with regard to other embodiments, the first and second grooves 440, 444 may be aligned with tangential planes of the tube 438 containing the explosive charge 436 to facilitate a collision-free separation and ejection of the first section 448 relative to the second section 452. In this embodiment, the first and second grooves 440, 444 on the first and second laterally extending doublers 426, 430, respectively, are staggered (e.g., not coplanar relative to one another). The first and second grooves 440, 444 define weak areas (e.g., break planes) of the first and second doublers 426, 430, which will thus break along break planes defined by the grooves 440, 444 when the explosive 436 is detonated. To further facilitate a collision-free longitudinal separation and ejection, the separation system 420 also includes a slide plane 470 defined by first and second slide members 460, 464, along which the first section 448 may be slidably moved longitudinally relative to the second section 452 in a collision-free manner during ejection of the first section 448. In this regard, the slide members 460, 464 inhibit lateral movement of the first section 448 relative the second section 452 during ejection of the first section 448. Of course, a single cord explosive may be utilized instead of the dual cord explosive illustrated in FIG. 6.

In another aspect of the present invention, illustrated in FIG. 7A–7C, a separation system for separating a first section from a second section is provided. Referring to FIG. 7A, the separation system 520 includes first and second doublers 526, 530 extending between and interconnecting the first and second sections 548, 552. The system 520 further includes an explosive 536 enclosed within an elastomer 537, both of which are contained within an expandable (e.g., inflatable) metal tube 538. The explosive 536, the elastometer 537 and expandable metal tube 538 are positioned within a cavity defined by the inner (e.g., explosive-facing) walls 527, 531 of the first and second doublers 526, 530, respectively, the tube 538 being interconnected to the second section 552 via a stainless steel strap 555 wrapped therearound. The separation system 520 further includes a slide plane means having first and second slide members 560, 564, which define a slide plane. The first and second slide members 560, 564, are interconnectable to the first and second sections 548, 552, respectively. As such, upon firing of the explosive charge 536, which expands the tube 538, the first and second doublers 526, 530 are severed or fractured, as illustrated in FIG. 7B, which enables the first section 548 to be separated from and relative to the second section 552. The first and second slide members 560, 564 are slidably engagable with one another during separation and ejection of the first section 548 relative to the second section 552 to substantially inhibit significant downward longitudinal movement of the first section 548 relative to the second section 552, which is especially beneficial in instances where the second section 552 continues to move longitudinally upward. In this regard, collision of the first section 548 and the second section 552 upon severance of the first and second doublers 526, 530 may be inhibited.

In order to further reduce the possibility of an adverse collision, the separation system may further include bend augmentation means associated with (e.g., interconnectable to, integrally formed in or on) first and second structural members 526, 530, respectively, for facilitating bending or hinging of the first and second structural members 526, 530, as illustrated in FIGS. 7A–7C. In this embodiment, bend augmentation means define reinforced or stiffened portions 580, 582 which enhance bending or hinging of the first and second structural members 526, 530 in selected portions, such that upon firing of the explosive 536, the expanding tube 538 will cause the first and second structural members 526, 530 to rotate about or proximate the reinforced portions 580, 582, respectively, and break at first and second staggered notches 540, 544 on the first and second structural members 526, 530, respectively, displaced from the augmentation means 580, 582. In this regard, the bend augmentation means or reinforced portions can be a separate piece 580 (e.g., doubler plate, slide plane components, etc.) of stiffening material (e.g., metal, such as titanium, aluminum, stainless steel, or combinations and/or composites thereof) interconnected to the first structural member 526, as illustrated in FIG. 7A. Alternatively, the bend augmentation means or reinforced portion can be a thickened portion of the structural member or doubler. In this embodiment, the reinforced portion comprises a thickened portion 582 of the second structural member 530, the thickened portion 582 being integrally formed with the second structural member 530 to provide one or more thickened, less fracturable portions of the second structural member 530, as illustrated in FIG. 7A. Such thickened portion 582 has a thickness greater than that of the doublers 526, 530 themselves, and greater than thickness of the doublers 526, 530 at the first and second grooves 540, 544, respectively. In this regard, the doublers 526, 530 will fracture or sever at the first and second grooves 540, 544, respectively, and bend proximate the reinforced areas 580, 582.

FIGS. 8A–8C illustrate another embodiment of the separation system of the present invention. In this embodiment, the separation system 620 includes first and second doublers 626, 630 for interconnecting, at least initially, first and second sections 648, 652 to be separated, and explosive 636 contained within an expandable metal tube 638, the explosive 636 and tube 638 being contained within a cavity defined by the first and second doublers 626, 630 and first and second sections 648, 652. In addition, the separation system 620 includes first and second grooves 640, 644, which define lines of fracture in the first and second structural members 626, 630, respectively, the first and second structural members 626, 630 fracturable upon detonation of the explosive 636 and resulting expansion of the tube 638 to a circular cross-section. For purposes of facilitating such fracture and to reduce the amount of explosive required to bend the first and second structural member 626, 630 upon expansion of the tube 638, the separation system 620 further includes bend augmentation means. In this embodiment, the bend augmentation means comprises relief portions 690, 692 on the first and second structural members 626, 630, respectively. Alternatively, the bend augmentation means comprises reinforced portions, which are described hereinabove.

As illustrated in FIG. 8A, for purposes of facilitating a relatively collision-free separation of the first section 648 relative to the second section 652, the first and second grooves 640, 644 on the first and second doublers 626, 630 of the separation system 620 are staggered relative to each other. In this embodiment, the first and second grooves 640, 644 are positioned along first and second tangential planes defined by first and second end portions 639a, 639b of the tube 638 in an unexpanded state. In order to enhance the bendability of these doublers 626, 630 upon firing of the explosive 636 and resulting fracture of the doublers 626, 630, the relief portions 690, 692 on the first and second doublers 626, 630, respectively, are displaced from the grooves 640, 644, respectively. In this embodiment of the separation system, the relief portions 690, 692 on the first and second doublers 626, 630 are also staggered relative to each other. In particular, for purposes of enhancing the bendability of the doublers 626, 630 upon detonation of the explosive 636, the relief portions 690, 692 are positionable proximate the second and first tangential planes defined by the second and first end portions 639b, 639a, respectively, of the unexpanded tube 638. Furthermore, in order to ensure fracture and severance of the doublers 626, 630 at the grooves 640, 644, respectively and not at the relief portions 690, 692, the relief portions 690, 692 define a thickness through the doublers 626, 630 which is greater than thickness of the first and second doublers 626, 630 defined by the first and second grooves 640, 644, respectively. In this regard, upon firing or detonation of the explosive 636 and subsequent expansion of the tube 638 to a circular configuration, the first and second doubler 626, 630 fracture at the first and second staggered groove 640, 644 and bend about the relief portions 690, 692 displaced from the first and second grooves 640, 644, as illustrated in FIG. 8B. As such, less explosive force is required to fracture and bend the doublers 626, 630.

Substantially as described hereinabove in relation to other embodiments, the separation system 620 may further a slide plane means having first and second slide members 660, 664 to further facilitate a relatively collision-free lateral separation and ejection of the first section 648 relative to the second section 652. In this regard, the first and second slide members 660, 664 are interconnected to the first and second sections 648, 652 and are oriented approximately 90° relative to the longitudinally extending first and second doublers 626, 630. As such, these slide members 660, 664 inhibit damage-causing collisions between severed portions 629a, 629b, 633a, 633b of the first and second doublers 626, 630 and with the expanded tube 638 by at least initially inhibiting downward longitudinal movement of the first section 648 relative to the second section 652, as illustrated in FIG. 8C.

In yet another embodiment, illustrated in FIGS. 9A–9C, the first and second staggered grooves 740, 744 of the separation system 720 cooperate with the bend augmentation means 790, 792 on the first and second doublers 726, 730 to provide a relatively collision-free separation of the first section 748 relative to the second section 752. In this embodiment, the second groove 744 on the second doubler 730 is positionable proximate a center portion of the explosive means (e.g., proximate the explosive 736 or a center portion of the tube 738), staggered or offset from the first groove 740, which is positionable along a tangential plane defined by the first end portion 739a of the expandable tube 738 containing the explosive 736. For purposes of enhancing the bendability of the doublers 726, 730 upon detonation of the explosive 736 and expansion of the tube 738, a first bend augmentation means comprising a relief portion 790 is positionable in the first doubler 726 a distance from the first groove 740, proximate (e.g., in alignment with) a second tangential plane defined by a second end portion 739b of the tube 738. Further, bend augmentation means comprising relief portions 792, 794 in the second doubler 730 are positionable on either side of the center positioned second groove 744 in the second doubler 730. In particular, for purposes of enhancing the bendability of the second doubler 730 upon severance of the second doubler 730 at the second groove 744, the relief portion 792, 794 on the second doubler are positionable proximate the first and second tangential planes defined by the first and second ends 739a, 739b of the tube 738. In this regard, as the tube 738 expands to a circular configuration upon detonation of the explosive 736, the severed sections of the doublers 726, 730 are easily bendable about the relief portions 790, 792 and 794, radially outwardly relative to the tube 738. As such, the relief portions 790, 792, 794 on the doublers 726, 730 facilitate bending of the first and second doublers 726, 730 upon expansion of the tube 738. In addition, to ensure fracture of the doublers 726, 730 at the grooves 740, 744 and not at the relief portions 790, 792, 794, thicknesses of the first and second doublers 726, 730 defined by the first and second grooves 740, 744 are less than thicknesses of the first and second doublers 726, 730 defined by the relief portions 790, 792, and 794. Alternatively, the bend augmentation means utilized in this embodiment comprise reinforced portions, which are described hereinabove.

The bend augmentation means of the present invention may also be used in separation systems which utilize opposing or coplanar grooves. Referring to FIGS. 10A–10C, a separation system 820 of the present invention includes first and second doublers 826, 830, an expanding tube explosive charge system contained between the first and second doublers 826, 830, and first and second grooves 840, 844 positioned on the first and second doublers 826, 830, respectively. In this embodiment, the first and second grooves 840, 844 are positioned opposite each other, along a first tangential plane defined by a first end portion 839*a* of the expandable tube 838 containing the explosive 836. In this regard, upon detonation of the explosive 836, the first and second doublers 826, 830 will fracture at the first and second grooves 840, 844, as illustrated in FIG. 10B.

For purposes of providing first and second doublers 826, 830 which are easily bendable upon detonation of the explosive 836, the separation system 820 further includes first and second bend augmentation relief portions 890, 892 positioned on the first and second doublers 826, 830, respectively. In order to minimize the amount of force required to rotate or bend the first and second doublers 826, 830, the first and second bend augmentation relief portions 890, 892, respectively, are positionable proximate a second tangential plane defined by a second portion 839*b* of the expandable tube 838. As previously described hereinabove with respect to other embodiments of the present invention, the thickness of the first and second doublers 826, 830 at the relief portions 890, 892, respectively, is greater than the thicknesses of the first and second doublers 826, 830 at the first and second grooves 840, 844, respectively, in order to fracture the first and second doublers 826, 830 at the first and second grooves 840, 844, respectively and to bend the first and second doublers 826, 830 about the relief portions 890, 892, respectively. For purposes of achieving a substantially collision free separation of the first section 848 relative to the second 852, the separation system 820 may further include a slide plane means comprising first and second slide members 860, 864 to at least initially guide the first section 848 at least orthogonally relative to the second section 852, substantially as described hereinabove in relation to other embodiments.

Figure 11C:
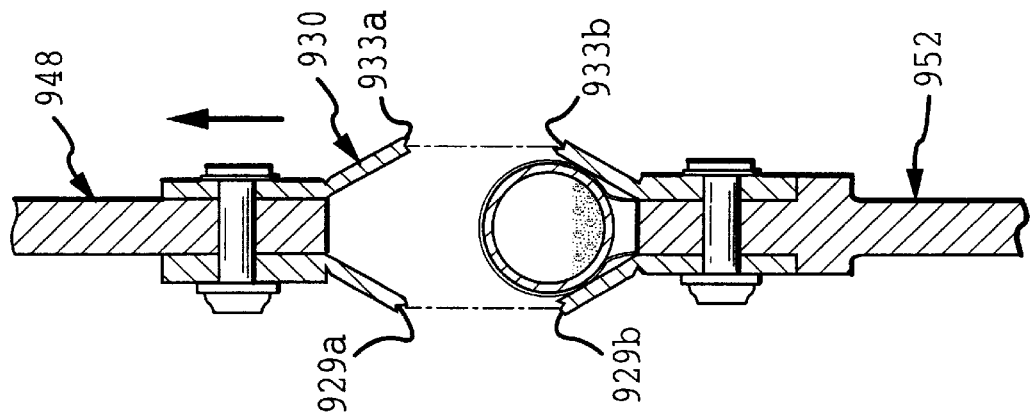
FIGS. 11A–11C illustrate cross-sectional progressive views of another embodiment of the separation system of the present invention.
Figure 11B:
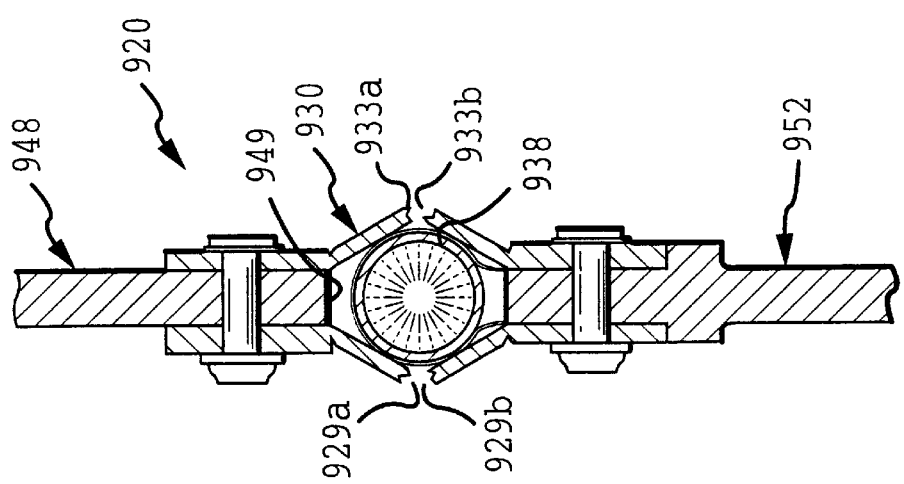
Figure 11A:
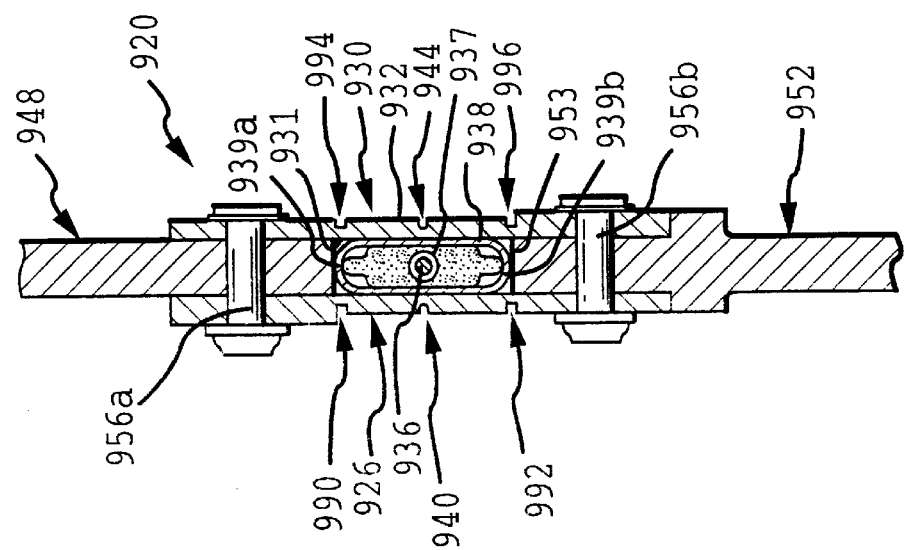

FIGS. 11A–11C illustrate yet another embodiment of the present invention wherein coplanar or opposing grooves on doublers are utilized. In this embodiment, the separation system 920 includes first and second grooves 940, 944 positioned on first and second doublers 926, 930, an explosive means positioned between the first and second doublers 926, 930 and a bend augmentation means for facilitating bending of the first and second doublers 926, 930 upon detonation of the explosive 936. Since at least lateral separation of the first section 948 relative to the second section 952 requires at least some initial longitudinal separation to avoid adverse contact between the expanded tube 938 and the severed end portions 929, 929*b*, 933*a*, 933*b*, this embodiment of the present invention is directed to achieving at least initially a longitudinal separation of the first section 948 relative to the second section 952. Such longitudinal separation may be accomplished by utilizing an ejection system (not shown).

In this embodiment, the first and second grooves 940, 944 on the first and second doublers 926, 930 are positioned proximate a center portion of the explosive 936 or expandable tube 938. In this regard, upon firing of the explosive 936, forces generated to expand the tube 938 will sever the doublers 926, 930 at the first and second grooves 940, 944, respectively, which correspond areas of maximum diameter of the expanded tube 938. In order to enhance bendability of the doublers 926, 930 having such center positioned grooves 940, 944, respectively, bend augmentation means comprising reinforced portions or relief portions are positionable on the first and second doublers 926, 930, along or proximate first and/or second tangential planes defined by end portions 939*a*, 939*b* of the tube 938. In this embodiment, relief portions 990, 992 are positionable on the first doubler 926 and relief portions 994, 996 are positionable on the second doubler 930, along the first and second tangential planes defined by the end portions 939*a*, 939*b* of the tube 938. As in the embodiments described hereinabove, to ensure fracture at the grooves and bending at the relief portions, the thickness of the first and second doublers 926, 930 at the first and second grooves 940, 944 is less than the thickness of the first and second doublers 926, 930 at the relief portions 990, 992, 994, 996.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for separating first and second sections, comprising:

first and second structural members interconnectable to at least the first and second sections, said first structural member being displaced from and interconnected to said second structural member;

an explosive assembly, positionable between said first and second structural members, for breaking at least one of said first and second structural members; and slide plane means, interconnected to at least one of said first and second structural members, for at least initially guiding one of the first and second sections away from the other of the first and second sections along a path defined by said slide plane means, wherein said slide plane means includes first and second pads having opposing surfaces for slidably engaging each other, said first and second pads being interconnectable to the first and second sections, respectively.

2. A separation system, as claimed in claim 1, said first pad orientable between about 1 degree and about 90 degrees relative to at least one of said first and second structural members.

3. A separation system, as claimed in claim 1, said first pad orientable at about 90 degrees relative to at least one of said first and second structural members.

4. A separation system, as claimed in claim 1, wherein said first and second pads are orientable at about 90 degrees relative to at least one of said first and second structural members.

5. A separation system, as claimed in claim 1, further comprising:

a coating, appliable on said slide plane means, for facilitating separation of the first and second sections.

6. A separation system, as claimed in claim 1, further comprising:

first and second notches positionable on said first and second structural members, respectively, wherein said first and second structural members are fracturable at said first and second notches, respectively, upon firing of said explosive assembly.

7. A separation system, as claimed in claim 6, wherein said first pad and at least said first notch are alignable.

8. A separation system, as claimed in claim 6, wherein said first and second notches on said first and second structural members are coplanar, said slide means being alignable with said first and second notches.

9. A separation system, as claimed in claim 6, wherein said first and second notches on said first and second structural members are offset relative to each other, said slide means being alignable with one of said first and second notches.

10. A separation system, as claimed in claim 1, further comprising:
    a bend augmentation means, located on at least a first portion of at least one of said first and second structural members, for hinging said at least one of said first and second structural members about said first portion of said at least one of said first and second structural members.

11. A separation system, as claimed in claim 10, wherein said bend augmentation means comprises one of a reinforced portion and at least a first relief portion on said first portion of said at least one of said first and second structural members, wherein at least a portion of said bend augmentation means is alignable with said slide plane means.

12. A system, as claimed in claim 1, further comprising:
    a low friction coating, applicable to at least one of said opposing surfaces of said first and second pads, for facilitating separation of the first structure away from the second structure.

13. A system for separating first and second structures, comprising:
    first and second structural members interconnected to said first and second structures, respectively, said first and second structural members both extending in a first direction, wherein said first structural member is displaced from said second structural member, along a second direction perpendicular to said first direction;
    first and second grooves, positioned on said first and second structural members, respectively, for defining first and second lines of fracture in said first and second structural members, respectively;
    an explosive assembly, positionable between said first and second structural members, for breaking said first and second structural members along said first and second lines of fracture through said first and second structural members; and
    slide plane means, interconnectable to at least one of said first and second structures, for at least initially guiding said first structural member away from said second structural member upon fracturing of said first and second structural members, wherein said slide plane means includes first and second pads having opposing surfaces for slidably engaging each other, said first and second pads being interconnectable to the first and second structures, respectively.

14. A system, as claimed in claim 13, wherein said first and second grooves on said first and second structural members, respectively, are coplanar, wherein said slide plane means is alignable with said first and second grooves.

15. A system, as claimed in claim 14, wherein said first and second grooves on said first and second structural members, respectively, are alignable with a first tangential plane defined by a first end portion of said explosive assembly.

16. A system, as claimed in claim 13, wherein said first and second grooves on said first and second structural members, respectively, are offset relative to each other in the first direction, wherein said slide plane means is alignable with one of said first and second grooves.

17. A system, as claimed in claim 16, wherein said first groove on said first structural member is alignable with a first tangential plane defined by a first end portion of said explosive assembly and said second groove on said second structural member is alignable with a center portion of said explosive assembly, said slide plane assembly being alignable with said first groove.

18. A separation system, as claimed in claim 13, further comprising:
    bend augmentation means, positioned at a first portion of at least one of said first and second structural members, for bending said at least one of said first and second structural members at said first portion.

* * * * *